US009000992B2

(12) United States Patent
Kai et al.

(10) Patent No.: US 9,000,992 B2
(45) Date of Patent: Apr. 7, 2015

(54) ANTENNA DEVICE AND RFID SYSTEM

(75) Inventors: Manabu Kai, Kawasaki (JP); Teruhisa Ninomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 13/175,098

(22) Filed: Jul. 1, 2011

(65) Prior Publication Data

US 2012/0012655 A1 Jan. 19, 2012

(30) Foreign Application Priority Data

Jul. 14, 2010 (JP) ................................. 2010-159324

(51) Int. Cl.

*G06K 7/01* (2006.01)
*H01Q 9/00* (2006.01)
*H01Q 1/22* (2006.01)
*H01Q 11/02* (2006.01)
*H01Q 13/28* (2006.01)

(52) U.S. Cl.

CPC ............. *H01Q 1/2216* (2013.01); *H01Q 11/02* (2013.01); *H01Q 13/28* (2013.01)

(58) Field of Classification Search

CPC ...... H01Q 11/02; H01Q 1/2216; H01Q 13/28
USPC .......................................... 343/793, 795, 731
See application file for complete search history.

(56) References Cited

U.S. PATENT DOCUMENTS 3,631,504 A * 12/1971 Suetaki et al. ................ 343/840
7,388,550 B2 * 6/2008 McLean ........................ 343/725
2006/0000907 A1 1/2006 Forster
2009/0289795 A1 11/2009 Yamagajo et al.
2011/0221547 A1 * 9/2011 Tezuka et al. ................ 333/236

FOREIGN PATENT DOCUMENTS

EP 1926221 5/2008
JP 11-355039 12/1999
JP 2007-150654 6/2007
JP 2009-280273 12/2009
JP 2010-114696 5/2010
JP 2010114696 A * 5/2010 ............. H01Q 13/28
JP 2010-136135 6/2010
WO 2009/157791 12/2009

OTHER PUBLICATIONS

Extended European Search Report dated Aug. 17, 2012 in corresponding European Patent Application No. 11173764.9.
Japanese Office Action issued Dec. 17, 2013 in corresponding Japanese Patent Application No. 2010-159324.
(Continued)

*Primary Examiner* — Michael C Wimer
*Assistant Examiner* — Michael Bouizza
(74) *Attorney, Agent, or Firm* — Staas & Halsey LLP

(57) ABSTRACT

There is provided an antenna device for transmitting a radio wave to a tag capable of receiving the radio wave includes a first layer, a second layer, and a first plate which is disposed on or above the second layer. These are electrically conductive. The second layer is disposed apart from the first layer and includes a plurality of non-electrically conductive portions to generate an electromagnetic wave travelling along a first axis above the second layer. Further, the first plate is disposed on or above the second layer to allow the tag to receive the radio wave transmitted from the antenna.

24 Claims, 15 Drawing Sheets

(56) References Cited

OTHER PUBLICATIONS

Chinese Office Action mailed Sep. 22, 2013 in corresponding to Chinese Application No. 201110195904.0.

Chinese Office Actions issued Jan. 24, 2014 in corresponding Chinese Patent Application No. 201110195904.0.

* cited by examiner

ANTENNA DEVICE AND RFID SYSTEM

CROSS-REFERENCE TO RELATED APPLICATION

This application is based upon and claims the benefit of priority of the prior Japanese Patent Application No. 2010-159324, filed on Jul. 14, 2010 the entire contents of which are incorporated herein by reference.

FIELD

The embodiments discussed herein are related to a technique for performing communication between antenna devices with radio waves or to a technique for performing non-contact communication between a reader/writer and a RFID tag as a specific example of application.

BACKGROUND

A radio frequency identification system (RFID system) has been known. The RFID system is configured to read information from a RFID tag using a reader/writer. The RFID system sends a radio frequency signal of about 1 W (watt) to the RFID tag which is distantly-positioned from the RFID system and receives a response signal from the RFID tag. The channel used for sending and receiving radio signals between the RFID system and the RFID tag may be in the UHF band (860 to 960 MHz). In Japan, radio frequencies ranging from 952 to 954 MHz are used as the channel. The communication distance between the RFID system and the RFID tag is about 3 to 10 m, depending on the antenna gain of the RFID tag used, the operating voltage of a radio IC chip used, the antenna gain of the reader/writer used and the surrounding environment. The RFID tag includes an antenna and the IC chip (about 0.5 mm square) which is electrically coupled with a feed point of the antenna without mounting a specific matching circuit. In the RFID tag, an antenna pattern is formed on a transparent film sheet by printing, etching or the like.

The IC chip of the RFID tag may be equivalently expressed using a parallel circuit of an internal resistance Rc (for example, 1700 Ω) and a capacitance Cc (for example, 1.0 pF). Likewise, the antenna of the RFID tag may be equivalently expressed using a parallel circuit of a radiation resistance Ra (for example, 2000 Ω) and an inductance La (for example, 30 nH). Owing to parallel connection of the IC chip with the antenna, a resonance will be generated by the capacitance Cc and the inductance La to establish impedance matching at a desirable resonance frequency fo (for example, 953 MHz). As a result, the RFID tag is allowed to obtain a maximum received power. The resonance frequency fo is expressed as follow:

$$f_o = \frac{1}{2\pi \times (L_a \times C_c)^{1/2}}.$$

There is also known an electromagnetic wave transmission sheet which includes a meshed electrode to be usable for the RFID system. The sheet has a width dimension to almost equal to the integral multiple of a half of the wave length of the electromagnetic wave which travels along the surface of the sheet in a direction orthogonal to the direction of the width. Due to the width dimension, the sheet may produce a resonance of the electromagnetic wave in the direction orthogonal to the travelling direction. The electromagnetic wave transmission sheet has a three-layered structure: the meshed electrode, a flat plate electro conductive layer, and a dielectric layer which is sandwiched by the others. The structure is understood to contribute generation of the electromagnetic wave in a certain distance above from the sheet. As an application of the electromagnetic wave transmission sheet, Japanese Laid-open Patent Publication No. 2010-114696 has disclosed a RFID system for managing goods stocked on a shelf. The system includes a reader/writer and the electromagnetic wave transmission sheet which are electrically coupled each other with a coaxial cable. The electromagnetic wave transmission sheet is used as an antenna and disposed within the shelf to detect an RFID tag stuck on a peace of the goods to be managed by the RFID system. The RFID system has an advantage that a problem is prevented from erroneous detection of an RFID tag, which is pasted on goods not managed by the system, caused by unexpected transmission range of the electromagnetic wave from an antenna.

However, the conventional sheet has a problem that the detection of the RFID tag is depend on a direction of the RFID tag relative to that of the electromagnetic wave transmission sheet serving as an antenna to result in detecting no presence of the RFID tag in case when the RFID tag is positioned in a certain direction above the electromagnetic wave transmission sheet.

SUMMARY

According to an aspect of the invention, there is provided an antenna device that transmits a radio wave to a tag capable of receiving the radio wave. The antenna device includes a first layer, a second layer, and a first plate. These are electrically conductive. The second layer is disposed parallel to the first layer apart from the first layer so as to generate an electromagnetic wave travelling along a first axis and includes a plurality of portions so as to generate a leakage electric field above the second layer, where the plurality of portions are electrically non-conductive and the leakage electric field directs toward two directions which are contrary each other and parallel to a second axis which is orthogonal to the first axis and parallel to the second layer. The first plate is disposed on or above the second layer and has an area which has a first length along the first axis and the first length is determined so that a power of the radio wave received by the tag is equal to or than a first reference value when the tag is placed at a first elevation spaced above the first plate and is placed parallel to either of the first axis, the second axis, or a third axis, where the third axis is orthogonal to the first and second axis.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

EMBODIMENTS

Figure 1:
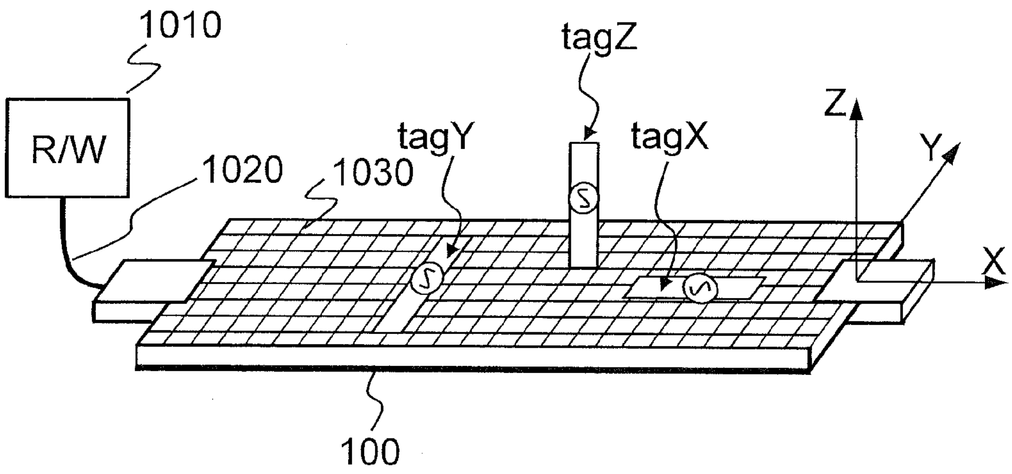
FIG. 1 is a diagram illustrating an electromagnetic wave transmission sheet to which the power is fed from a reader/writer and RFID tags which are arranged above the electromagnetic wave transmission sheet.

The problem described above will be discussed in detail with reference to FIG. 1 to FIG. 3C. FIG. 1 illustrates an electromagnetic wave transmission sheet 100, referred to as the sheet 100 for clarity, and the RFID tagX, tagY, and tagZ, which are arranged above the sheet 100 so that their longitudinal directions are parallel to respective coordinate axes X, Y, and Z according to a coordinate system illustrated in FIG. 1. The notations "tagX", "tagY", and "tagZ" are introduced to notify the positional state in which the RFID tags are arranged, for example, tagX is the RFID tag of which a longitudinal direction is arranged parallel to the X-axis. The sheet 100 is electrically coupled with a reader/writer (R/W) 1010 over a coaxial cable 1020 or the like such that the power is fed from the reader/writer 1010. As illustrated in FIG. 1, the sheet 100 includes a meshed electric conductive layer 1030. In the above mentioned situation, although the RFID tag may receive the radio waves when it is in a state indicated by tagX or tagZ, in some cases, it may be difficult for the RFID tag to receive the radio waves when it is in the state indicated by tagY.

Figure 2A:
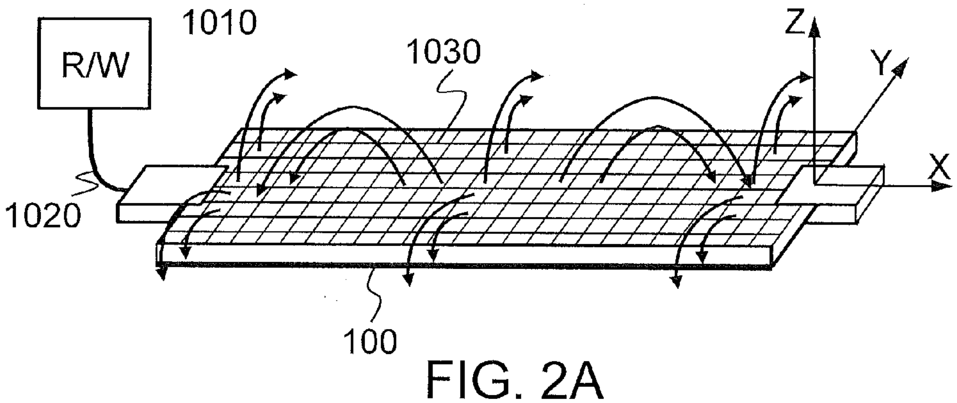
FIG. 2A to FIG. 2C are diagrams illustrating examples of states of leakage electric fields which are generated above an electromagnetic wave transmission sheet with time.
Figure 2B:
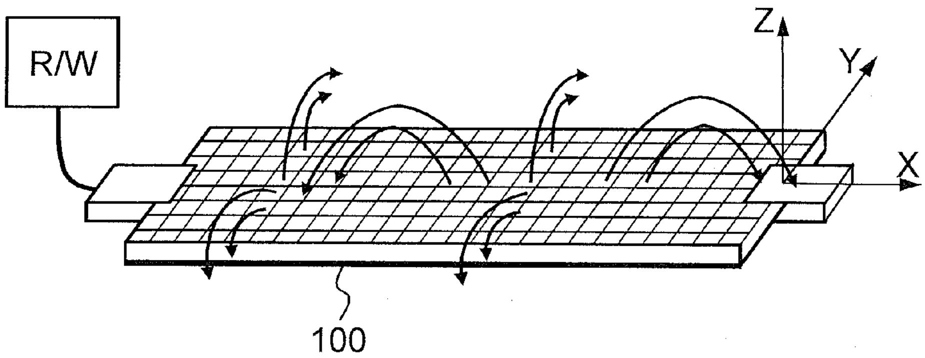
Figure 2C:
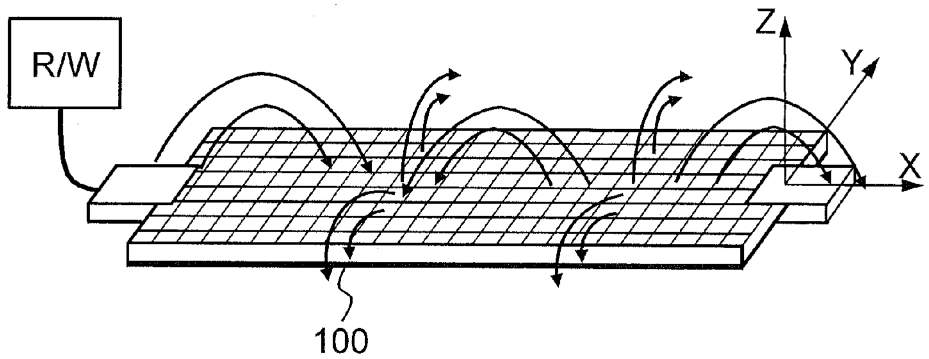
Figure 3A:
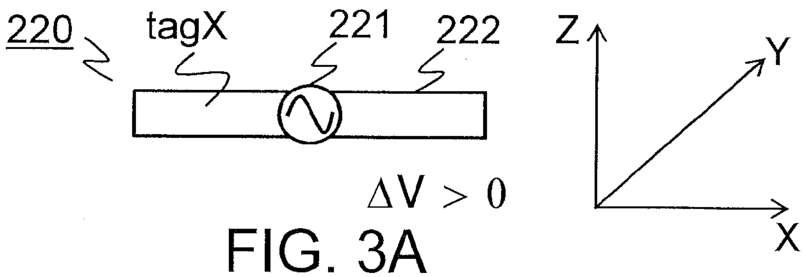
FIG. 3A to FIG. 3C are diagrams illustrating examples of states of electric fields that a RFID tag receives from an electromagnetic wave transmission sheet in each of arranged states of the RFID tag.
Figure 3B:
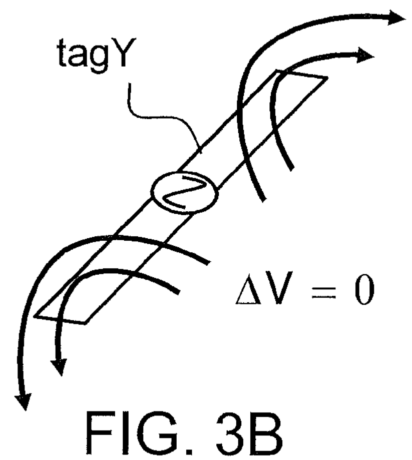
Figure 3C:
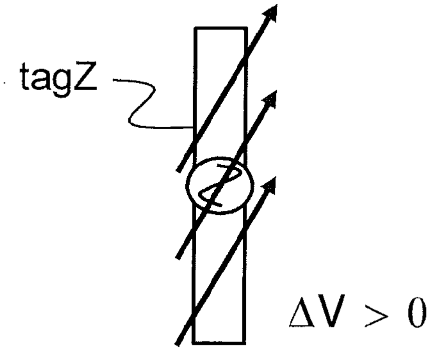

The above mentioned problem will be further described with reference to FIGS. 2A and 3C. FIGS. 2A to 2C are diagrams illustrating states of electric fields (hereinafter, referred to as leakage electric fields) that leak out (or ooze out) on the sheet 100 with time. FIG. 2A illustrates a state when t=t1, FIG. 2B illustrates a state when t=t2 (>t1), and FIG. 2C illustrates a state when t=t3 (>t2). In FIGS. 2A to 2C, the electric fields are illustrated enough for the explanation for the electric fields varying with time. FIGS. 3A to 3C illustrate states of electric fields that the RFID tag 220 receives from the sheet 100 when it is in the respective states as the tagX, the tagY and the tagZ. In FIGS. 3A to 3C, the RFID tag 220 includes an IC chip 221 and a dipole antenna 222 which has two elements extending from the IC chip 221 (a feed point) toward both ends of the dipole antenna 222. FIG. 3B illustrates a case in which the RFID tag 220 is in the state tagY of which a central portion is arranged at a position Y=0 of the coordinate system in FIG. 2B, that is, at the center of a short side of the sheet 100.

Referring to the examples in FIGS. 2A to 2C, on the sheet 100, an electromagnetic wave travel from one end at which the power is fed from the reader/writer 1010 toward the other end, that is, in an +X direction on the X axis. As a result, leakage electric fields generated in +X and −X directions travel in the +X direction as illustrated in FIGS. 2A to 2C. On the other hand, since a flat plate electric conductive layer is disposed as the lowermost layer of the electromagnetic wave transmission sheet 100, a leakage electric field is generated in two opposite directions, that is, in +Y and −Y directions on the Y-axis which is orthogonal to the X-axis along which the electromagnetic wave travels on the meshed electric conductive layer 1030. Then, as illustrated in FIGS. 2A to 2B, the leakage electric field generated in the +Y and −Y directions travels in the +X direction, the electromagnetic wave traveling direction, as a whole.

FIGS. 3A and 3C illustrate the RFID tag 220 in states "tagX" and "tagZ", respectively. In these states, the dipole antenna 222 of the RFID tag 220 receives the electric field formed by the leakage electric field. The electric field vibrates in a same direction over the dipole antenna 222, the direction is also called as a linear polarizing direction of electric field. As a result, a difference in voltage (ΔV>0) is made between the two elements of the dipole antenna 222 of the RFID tag 220. That is, the RFID tag 220 is excited with the leakage electric field and hence is allowed to receive the radio waves from the sheet 100.

However, the RFID tag 220 may not receive the electric wave generated by the sheet 100 in the case of the RFID tag 220 placed as followings. The RFID tag 220 in the state tagY illustrated in FIG. 3B is placed so that its longitudinal direction is parallel to the Y-axis and its central position is at the position Y=0. In this case, each electric field received by the respective elements of the dipole antenna 222 vibrates in a direction different from each other, that is, the field strength patterns of electric fields are symmetrical around the central point of the dipole antenna 222. As a result, a difference in voltage is not made between the two elements of the dipole antenna 222 of the RFID tag 220 (ΔV=0). That is, the RFID tag 220 is not excited with the leakage electric fields and hence it becomes difficult for the RFID tag 220 to receive the radio waves from the sheet 100. If the RFID tag 220 is arranged as the tagY in FIG. 3B and the central point of the dipole antenna 222 is moved from the position Y=0, the electric fields received by the respective elements grow asymmetrically and hence the RFID tag 220 is allowed to receive the radio waves from the sheet 100.

Therefore, according to one embodiment, the present invention aims to provide an antenna device and an RFID system which decrease the disadvantage or the problem described above. For example, the antenna device or the RFID system may be configured so that an RFID tag is allowed to receive radio waves caused by a leakage electric field regardless of a direction in which the RFID tag is arranged above and apart from the antenna device.

(1) First Embodiment

Next, an antenna device according to a first embodiment and an RFID system including the antenna device will be explained. In the following explanation and diagrams, the coordinate system is the same as that illustrated in FIGS. 1 and 2 is used. Further, states in which a RFID tag or a standard dipole antenna described later is arranged in parallel with the X-axis (a first axis), the Y-axis (a second axis) and the Z-axis (a third axis) will be respectively designated by tagX, tagY and tagZ.

(1.1) Configuration of Antenna Device and RFID System

Figure 4:
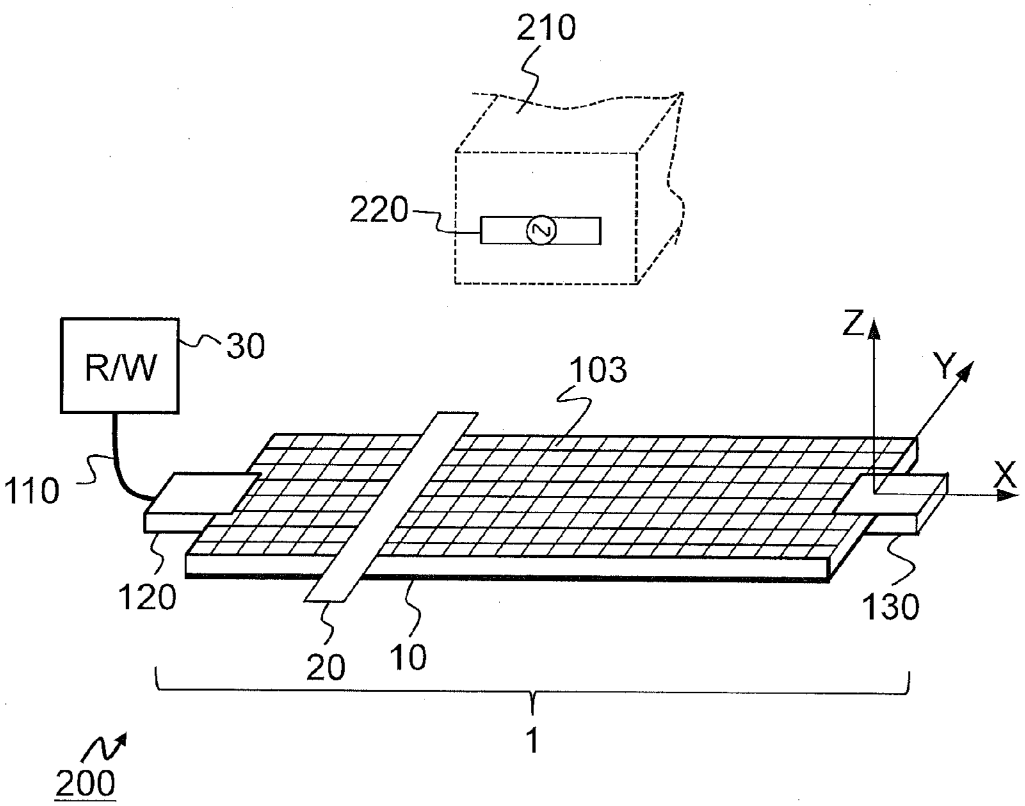
FIG. 4 is a diagram illustrating an example of an outline of an RFID system according to a first embodiment.
Figure 5A:
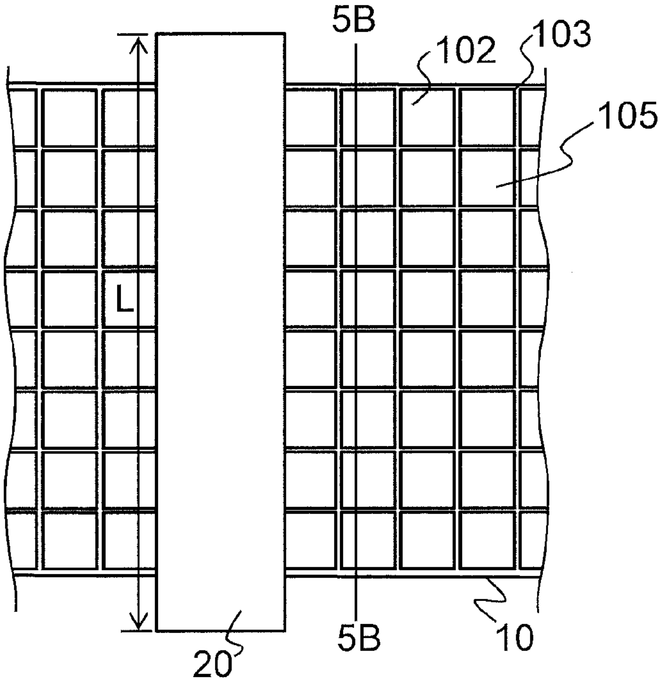
FIG. 5A and FIG. 5B are diagrams illustrating examples of a configuration of a sheet-shaped antenna of an antenna device according to the first embodiment.
Figure 5B:
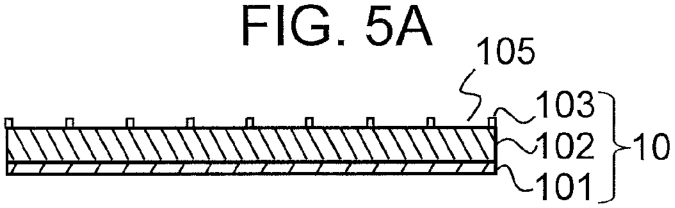

First, the configuration of the antenna device 1 and the RFID system 200 according to the first embodiment will be described with reference to FIGS. 4 to 5B. FIG. 4 is a diagram illustrating an example of an outline of the RFID system 200 according to the first embodiment. FIGS. 5A and 5B illustrate diagrams of an example of a configuration of a sheet-shaped antenna 10, serving a similar function to the electromagnetic wave transmission sheet 100, of the antenna device 1 according to the first embodiment. FIG. 5A is a plan view of a sheet-shaped antenna 10 and FIG. 5B is a sectional diagram taken along the 5B-5B line of the plan view.

As illustrated in FIG. 4, the RFID system 200 includes an antenna device 1 and a reader/writer (R/W) 30 which is electrically coupled with the antenna device 1 over a coaxial cable 110. The antenna device 1 includes a sheet-shaped antenna 10, a radiation plate 20 that functions as a first conductive part, a communication interface 120 and a terminator 130.

An RFID tag 220 above the antenna device 1 may communicate with the reader/writer 30. In more detail, the reader/writer 30 communicates with the RFID tag 220 appended to an article 210 disposed above the antenna device 1 without a wired connection between the sheet-shaped antenna 10 and the RFID tag 220 to read data in the RFID tag 220. One of the applications of the above mentioned RFID system 200 is an inventory management system in which the antenna device 1 is mounted on a bottom surface of a shelf for storing the goods, such as books, compact disks or the like, arrayed on the shelf.

As illustrated in FIG. 5B, the sheet-shaped antenna 10 has a laminated structure including a flat conductive layer 101 (a first conductive layer), a dielectric layer 102 which is disposed on the flat conductive layer 101, and a meshed conductive layer 103 (a second conductive layer) which is disposed on the dielectric layer 102. In the sheet-shaped antenna 10, the flat conductive layer 101 and the meshed conductive layer 103 are disposed parallel to and apart from each other to configure a transmission line. The meshed conductive layer 103 includes electrically non-conductive portions 105 to generate a leakage electric field in a space above the sheet-shaped antenna 10. The height of an area of the leakage electric fields generated on the sheet-shaped antenna 10 may vary depending on parameters such as, for example, the meshed pattern form of the meshed conductive layer 103, the thickness of the dielectric layer 102, the dielectric constant of the dielectric layer 102 and the like. The respective parameters may be appropriately set in accordance with the position and the receiving performance of a RFID tag 220 which is actually used. Though not illustrated in FIG. 5B, a protection layer may be formed on the meshed conductive layer 103.

The communication interface 120 includes, for example, a sub-miniature type A (SMA) connector which is connected with one end of the sheet-shaped antenna 10, and transfers a high-frequency signal from the reader/writer 30 to the sheet-shaped antenna 10. Further, the communication interface 120 also transfers to the reader/writer 30 a high-frequency signal that the sheet-shaped antenna 10 has received. The terminator 130 is disposed on the other end, opposite to the end with the communication interface 120, of the sheet-shaped antenna 10 and functions to absorb electromagnetic waves traveling from one end of the sheet-shaped antenna 10. The terminator 130 may be configured, for example, with a conductive plate and a resistance, or may be simply configured with a conductive plate mounted on the meshed conductive layer 103.

In the examples illustrated in FIGS. 4 to 5B, the radiation plate 20 is a rectangular conductive plate member which is disposed to form a desirable electric field distribution over the sheet-shaped antenna 10. The radiation plate 20 is adhered to the sheet-shaped antenna 10 with an adhesive, for example. The radiation plate 20 may be out of contact with the meshed conductive layer 103 of the sheet-shaped antenna 10. In the case that a protection layer is provided on the meshed conductive layer 103, the radiation plate 20 may be adhered onto the protection layer.

The radiation plate 20 is disposed when there is a possibility that the RFID tag 220 is positioned above the sheet-shaped antenna 10 in the state of tagY as illustrated in FIG. 1 or 3B. Supposing that the radiation plate 20 is not disposed and the RFID tag 220 is positioned in the state of tagY, electric fields received by the RFID tag 220 owing to presence of leakage electric fields may vibrate in opposite directions on two elements of the dipole antennas of the RFID tag 220 and the electric fields may grow symmetrically. Thus, a difference in voltage is not appeared between the two elements and hence the RFID tag 220 is not excited. Therefore, in the antenna device 1 according to the first embodiment, the radiation plate 20 is placed just below the RFID tag 220 under a circumstance that the RFID tag 220 may be placed at the position Y=0 in the state tagY. Owing to provision of the radiation plate 20, an electric field distribution above the sheet-shaped antenna 10 is formed different from that would be observed if the radiation plate 20 is not placed. Accordingly, it may become possible to excite the RFID tag 220 regardless of its state. More details will be described in (1.2).

As illustrated in FIG. 4 and FIG. 5A, the radiation plate 20 is preferably arranged such that a long side of the rectangle is in parallel with the Y-axis and the length L of the long side corresponds to a half wavelength of a frequency which is used between the plate-shaped antenna 10 and the RFID tag 220. The length will be about 165 mm, for example at 953 MHz which is one of frequencies that the RFID system is permitted to use in Japan, if the flat conductive layer 101 is separated from the meshed conductive layer 103 in the air. In the case that the dielectric layer 102 is included as the first embodiment, it may be preferable to set the length in a range from about 140 to 170 mm, although depending on the dielectric constant of the dielectric layer 102.

(1.2) Distribution of Electric Fields that Antenna Device 1 Generates and Excitation of Radio Tag on Radiation Plate 20

Figure 6:
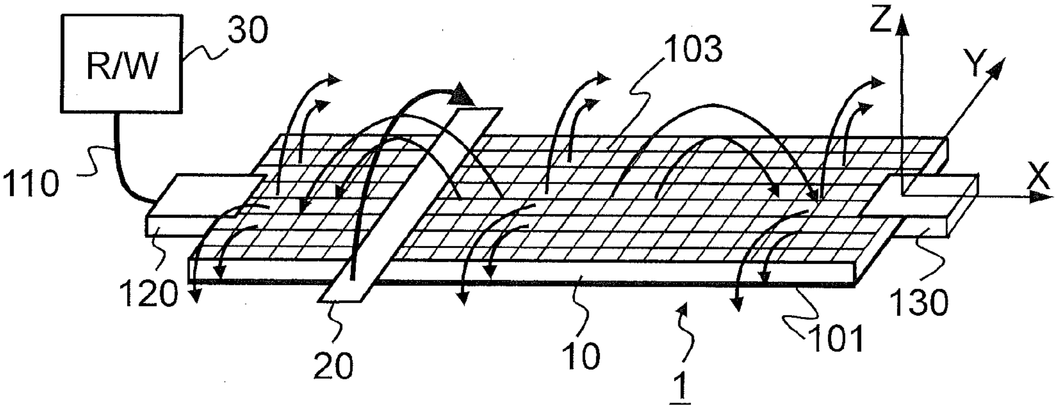
FIG. 6 is a diagram illustrating an example of a state of leakage electric fields generated above the antenna device according to the first embodiment.
Figure 7A:
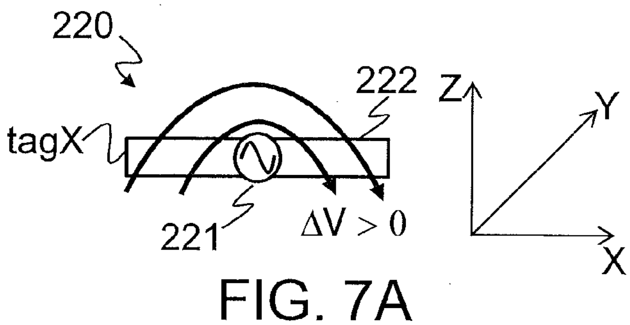
FIG. 7A to FIG. 7C are diagrams illustrating examples of the states of electric fields that a RFID tag which is arranged above a radiation plate receives from an antenna device in each of states of the RFID tag in the RFID system according to the first embodiment.
Figure 7B:
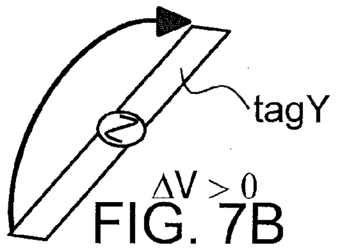
Figure 7C:
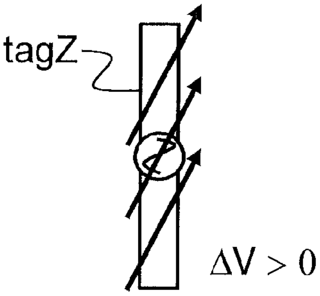
Figure 8A:
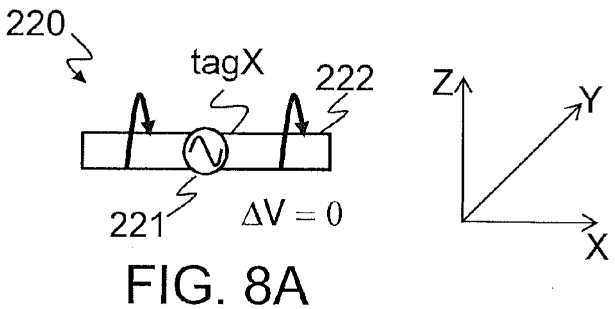
FIG. 8A to FIG. 8C are diagrams illustrating examples of states of electric fields that a RFID tag which is arranged above a radiation plate receives from an antenna device in each of arranged states in the case that the radiation plate is too wide in the first embodiment.
Figure 8B:
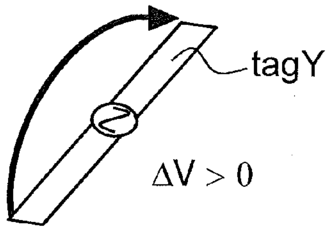
Figure 8C:
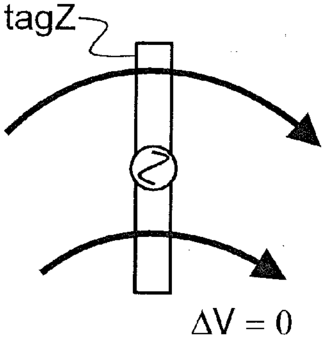

Referring to FIGS. 6 to 8C, there will be described on a distribution of electric field generated by the antenna device 1 and excitation of the RFID tag 220 above the radiation plate 20 which would occur owing to generation of the electric field. FIG. 6 is a diagram illustrating an example of a state of leakage electric fields generated on and above the antenna device 1 according to the first embodiment. FIG. 7A to FIG. 7C are diagrams illustrating examples of states of electric fields received by the RFID tag 220 arranged above the radiation plate 20. FIGS. 7A, 7B, and 7C correspond to the states tagX, tagY and tagZ in respect to the position of the antenna device 1. In FIG. 7A to FIG. 7C, each RFID tag 220 includes a dipole antenna 222 extending from a central IC chip 221 at a position of a feed point toward the both ends of the RFID tag 220. FIGS. 8A to 8C are diagrams corresponding to FIGS. 7A to 7C, respectively, in which electric fields received by the RFID tag 220 are schematically illustrated when each RFID tag 220 is arranged above the radiation plate 20 of which width is too large.

Referring to the example in FIG. 6, the flat conductive layer 101 and the meshed conductive layer 103 of the sheet-shaped antenna 10 configure a transmission line as described above. Accordingly, electromagnetic waves travel from one end at which the power is fed from the reader/writer 30 toward the other end on which the terminator 130 is positioned. Using the coordinate system illustrated in FIG. 6, the electromagnetic waves travel in the +X direction on the X-axis. In the above mentioned situation, since the non-conductive parts are partially formed in the meshed conductive layer 103 disposed on the upper side of the sheet-shaped antenna 10, leakage electric fields are generated on and above the sheet-shaped antenna 10. Further, since the flat conductive layer 101 is disposed as the lowermost layer of the sheet-shaped antenna 10, leakage electric fields are also generated on the meshed conductive layer 103 in two opposite directions, that is, in the +Y and −Y directions on the Y-axis. Accordingly, the leakage electric fields are oriented orthogonally to the travelling direction of the electromagnetic waves. Then, the leakage electric fields generated in the +Y and −Y directions also travel in the +X direction, the traveling direction of the electromagnetic waves, as a whole.

On the other hand, owing to the radiation plate 20 of the antenna device 1, components in the leakage electric fields which are generated in the +Y and −Y directions are interrupted to generate the electric field directed in the +Y direction as illustrated in FIG. 6, in which one bold line represents a plurality of lines of electric force directed in the +Y direction. As described above, preferably, the radiation plate 20 is disposed such that the longitudinal direction of the radiation plate 20 is in parallel with the Y-axis and the length of the longitudinal direction is set to be equal to a half wavelength of the frequency which is used between the antenna device 1 and the RFID tag 220. In the above mentioned situation, the strength of electric fields generated on the radiation plate 20 may be maximized and hence the RFID tag 220 is allowed to receive the radio waves from the antenna device 1 most effectively.

Further, as long as the width of the radiation plate 20, the length in the X-axis direction, is not too wide, the radiation plate 20 may not interrupt the electric fields directed in the +X or −X direction in the leakage electric fields. That is, as illustrated in FIG. 6, the leakage electric fields directed in the +X or −X direction are generated striding over the radiation plate 20.

In the case that the RFID tag 220 is arranged above the radiation plate 20 as illustrated in FIG. 6, the RFID tag 220 in the state in FIG. 7A or 7C will receive an leakage electric field vibrating in a same direction, +X direction or −X direction, thereon, where the electric field is effective to generate a voltage difference between the two elements of the dipole antenna and may be one same to the electric field when the radiation plate 20 is not disposed on the sheet-shaped antenna 10. That is, the RFID tag 220 which is arranged above the radiation plate 20 is excited with the leakage electric fields and hence is allowed to receive the radio waves from the antenna device 1.

On the other hand, an electric field which is directed in the +Y direction is formed owing to presence of the radiation plate 20. In the above mentioned situation, when the RFID tag 220 is arranged as illustrated in FIG. 7B above the radiation plate 20, the dipole antenna 222 of the RFID tag 220 receives the electric field vibrating in the same direction all over the two elements of the dipole antenna. As a result, a difference in voltage ($\Delta V>0$) is made between the two elements of the dipole antenna of the RFID tag 220 even in the state of FIG. 7B. That is, the RFID tag 220 arranged above the radiation plate 20 is excited with the electric fields which are generated owing to presence of the radiation plate 20 and hence is allowed to receive the radio waves from the antenna device 1.

As described above, the antenna device 1 according to the first embodiment is allowed to excite the RFID tag 220 which is arranged above the radiation plate 20 regardless of its state owing to provision of the radiation plate 20. However, in the case that the width, the length in the X-axis direction, of the radiation plate 20 is too wide, the leakage electric fields directed in the +X or −X direction are interrupted by the radiation plate 20 and it may become difficult to excite the RFID tag 220 depending on the direction in which the RFID tag 220 is arranged. In the following, description will be made with respect to this point.

When the RFID tag 220 arranged above the radiation plate 20 is arranged in the state tagY, the electric field directed in the +Y direction is formed owing to presence of the radiation plate 20 as illustrated in FIG. 8B. Thus, a difference in voltage ($\Delta V>0$) is made between the two elements of the dipole antenna of the RFID tag 220. That is, the RFID tag 220 arranged above the radiation plate 20 is excited with the electric fields which are generated owing to presence of the radiation plate 20 and hence is allowed to receive the radio waves from the antenna device 1 as in the case illustrated in FIG. 7B.

On the other hand, when the RFID tag 220 arranged above the radiation plate 20 is disposed in the states tagX or tagZ, the vibrating direction of the electric fields received by the dipole antenna of the RFID tag 220 are oriented in the same direction on the two elements owing to presence of the radiation plate 20, as illustrated in FIG. 8A and FIG. 8C. Accordingly, the strength of the electric fields received by the RFID tag 220 is symmetrical. In the example illustrated in FIG. 8A, arrowed lines directing from the front of the drawing toward the rear are indicated. In the above mentioned case, a difference in voltage is not made between the two elements of the dipole antenna 222 of the RFID tag 220 ($\Delta V=0$). That is, the RFID tag 220 is not excited with the electric fields generated owing to presence of the radiation plate 20 and hence is not allowed to receive the radio waves from the antenna device 1.

(1.3) Method of Determining Width of Radiation Plate 20

It is found from the above description that it is preferable to set the width, the length in the X-axis direction, of the radiation plate 20 in an appropriate range for surer excitation of the RFID tag 220 arranged above the radiation plate 20 regardless of its state. It is thought that the appropriate range of the width of the radiation plate 20 varies depending on a plurality of parameters such as, for example, the level of the leakage electric fields of the antenna device 1, the elevation at which the RFID tag 220 is arranged, a minimum operating power of the RFID tag 220 and the like. Accordingly, it may be difficult to set the width to one standard value. Thus, the inventors performed measurement using a plurality of radiation plates of different widths in order to clarify a preferable method of determining the width of the radiation plate 20 conforming to variable preconditions. That is, a standard dipole antenna imitating a RFID tag is arranged above each of the respective radiation plates 20 and the received power, the power generated in the standard dipole antenna, of each standard dipole antenna was measured. Measuring conditions are as follows.

[Measuring Conditions]

Sheet-shaped antenna: 800 mm (the length in the X-axis direction)×110 mm (the length in the Y-axis direction)

Working frequency: 952 to 954 MHz

Standard dipole antenna: 176 mm (the length), 2.5 mm in diameter

Position of the standard dipole antenna: the elevation of 100 mm measured from the radiation plate 20

Radiation plate 20: 150 mm (the length in the Y-axis direction), 5 to 60 mm (the length in the X-axis direction as the width: W)

Figure 9:
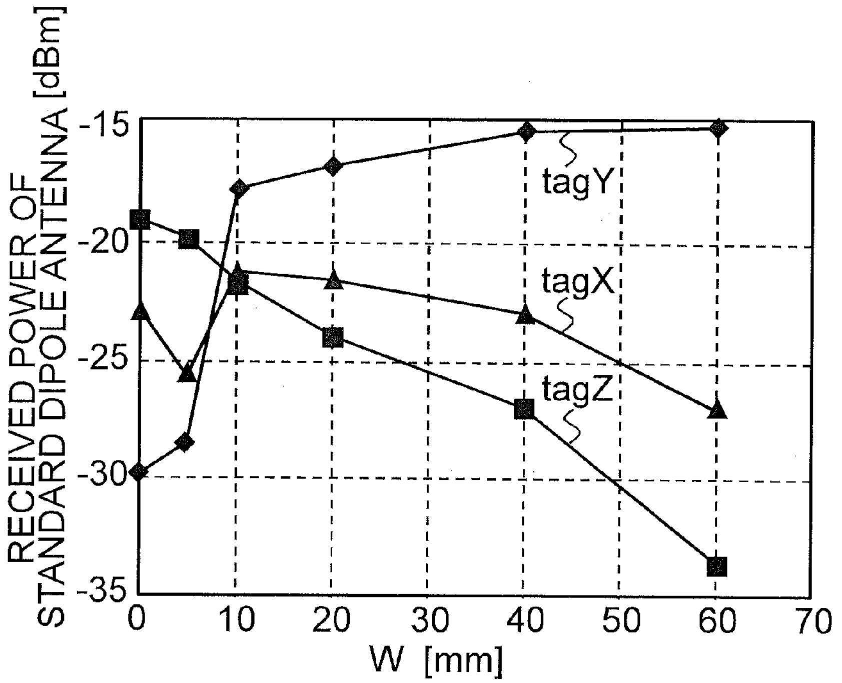
FIG. 9 is a graph illustrating an example of a relation between the width of the radiation plate and the received power of a standard dipole antenna in the first embodiment.

FIG. 9 illustrates an example of a graph indicating a relation between the width (W) of each radiation plate 20 and the received power of the standard dipole antenna as a result of measurement performed. In the example illustrated in FIG. 9, W=0 means that the radiation plate 20 was not disposed.

As illustrated in FIG. 9, when the radiation plate 20 is not disposed or the width (W) of the radiation plate 20 is narrow, the received power of the standard dipole antenna in the state tagX or tagZ is high, however the received power of the standard dipole antenna arranged in the state tagY is low as described above. The power received by the standard dipole antenna arranged in the state tagY grows larger gradually owing to presence of the radiation plate 20 when the width (W) of the radiation plate 20 becomes wider. On the other hand, the power received by the standard dipole antenna arranged in the state tagX or tagZ is gradually reduced as generation of leakage electric fields onto the radiation plate 20 is gradually lessened.

That is, it is found from the graph in FIG. 9 that the received power obtained by the standard dipole antenna may be expressed approximately by an increasing function for the width W of the radiation plate 20 when the standard dipole antenna is in the state tagY. Further, when the standard dipole antenna is in the state tagX or tagZ, the received power may be expressed approximately by a decreasing function for the width W.

By the use of results illustrated in FIG. 9, a width of the radiation plate 20 may be determined which allows the standard dipole antenna to receive a received power larger than a first predetermined reference value regardless of the state of the standard dipole antenna. For example, assuming that the first reference value is set to −25 dBm, the standard dipole antenna may obtain the received power larger than the first reference value regardless of the arranged state of the standard dipole antenna if the width (W) of the radiation plate 20 is set in a range from 7 to 27 mm. In the above measuring conditions, it is defined that the standard dipole antenna is disposed at the position of the elevation of 100 mm measured from the radiation plate 20. In the case that the elevation is set to a value lower than 100 mm, the standard dipole antenna may receive a received power larger than the first reference value regardless of the arranged state of the standard dipole antenna may be increased.

Viewing from the above measurement, it may be found to be preferable to set the width of the radiation plate 20 of the standard dipole antenna so as to receive a received power larger than the first predetermined reference value in each of the states tagX, tagY and tagZ.

Further, in the example illustrated in FIG. 9, it may be more preferable that the same received power be obtained regardless of the arranged state of the standard dipole antenna. Accordingly, it may be more preferable that the width of the radiation plate 20 is set to a value with which the received power obtained by the standard dipole antenna in the state tagY becomes substantially equal to the received power(s) obtained by the standard dipole antenna in the state(s) tagX and/or tagZ.

FIG. 9 merely illustrates an example of the result of measurement performed using the standard dipole antenna that has imitated the RFID tag. However, it may be said that the following two points are applicable tendencies regardless of the plurality of parameters such as the level of the leakage electric field of the antenna device 1, the elevation at which the RFID tag 220 arranged, the minimum operating power of the RFID tag 220. This is because the RFID tag 220 is the same as the standard dipole antenna in operating principle on the basis of which these elements function as antennas.

That is;

A1: the received power obtained by the RFID tag 220 generally serves as the increasing function for the width of the radiation plate 20 when the RFID tag 220 is arranged above the radiation plate 20 in the state tagY, and A2: the received power obtained by the RFID 220 serves as the decreasing function generally for the width of the radiation plate 20 when the RFID tag 220 is in the state tagX or tagZ.

Therefore, a person skilled in the art may be allowed to appropriately set the preferable width of the radiation plate 20 by obtaining data corresponding data as illustrated in FIG. 9 in accordance with the application of a RFID tag used and an RFID system applied on the basis of findings of the above mentioned points A1 and A2.

According to the first embodiment as described above, the radiation plate 20 is included as a conductive rectangular sheet-shaped member that forms a desirable electric field distribution on the sheet-shaped antenna 10 in the antenna device 1. Then, the width of the radiation plate 20 is set to a length with which the RFID tag 220 may obtain the received power larger than the first predetermined reference value when the RFID tag 220 is arranged at a position of at least a predetermined elevation measured from the radiation plate 20 and in the all states. Thus, the antenna device 1 according to the first embodiment is allowed to excite the RFID tag 220 which is arranged above the radiation plate 20 regardless of its arranged state. More preferably, the width of the radiation plate 20 is set to a value with which the received power obtained when the RFID tag 220 is in the state tagY becomes substantially equal to the received power obtained when the RFID tag 220 is in the state tagX or tagZ.

(1.4) Altered Embodiments

In the first embodiment described above, the meshed conductive layer 103 is disposed as a conductive layer disposed at an outermost side of the sheet-shaped antennas 10. However, the conductive layer is not limited to the meshed conductive layer 103. The conductive layer may include, for example, a striped layer of a striped conductive layer. Further, the conductive layer may include non-conductive rhombic or circular parts or portions instead of rectangular non-conductive ones as illustrated in FIG. 5A. Any form of non-conductive ones may be adopted when the conductive layer allows a leakage electric field to be generate in two opposite directions on an axis, the Y-axis in the example illustrated in FIG. 6, orthogonal to a direction, the +X direction on the X-axis in the example illustrated in FIG. 6, in which the electromagnetic waves travel. The antenna device 1 according to the first embodiment may be effectively used in particular to generate the leakage electric fields as described above.

Figure 10:
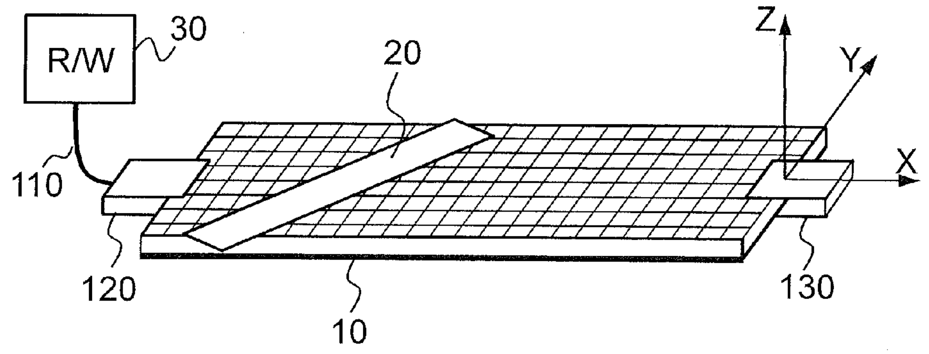
FIG. 10 is a diagram illustrating an altered embodiment of the antenna device according to the first embodiment.

The explanation of the antenna device 1 according to the first embodiment, the radiation plate 20 is rectangular so as to be arranged as the longitudinal direction in parallel to the Y-axis as illustrated in FIG. 6. However, the arrangement of the radiation plate 20 is not limited that illustrated in FIG. 6. That is, as illustrated in FIG. 10, the longitudinal direction of the rectangle of the radiation plate 20 need not necessarily be in parallel with the Y-axis. When the radiation plate 20 is arranged as illustrated in FIG. 10, electric fields (not illustrated) are formed in the direction in which the radiation plate 20 is arranged. The same thing as that which is applied to the case illustrated in FIG. 7B applies to the components directed in the Y-direction in electric fields which are generated in the above mentioned situation.

In addition, although the radiation plate 20 which is rectangular in form has been described by way of example, the radiation plate 20 may have another form. For example, the radiation plate 20 may have various forms such as, for example, a trapezoid, a flat hexagon, a flat ellipse and the like. More generally speaking, the radiation plate 20 needs only have a predetermined area which is wide enough to generate electric fields directed in one direction on the Y-axis (the axis orthogonal to the electromagnetic wave traveling direction) and not to interrupt electric fields directed in a direction along the X-axis (the axis in the electromagnetic wave traveling direction). Thus, a first length (the length of the short side of the rectangle) along the X-axis of the radiation plate 20 of any form above is at least set to a length (width) which allows the RFID tag 220 arranged at a predetermined elevation from the radiation plate 20 to obtain a received power larger than the first reference value.

Figure 11:
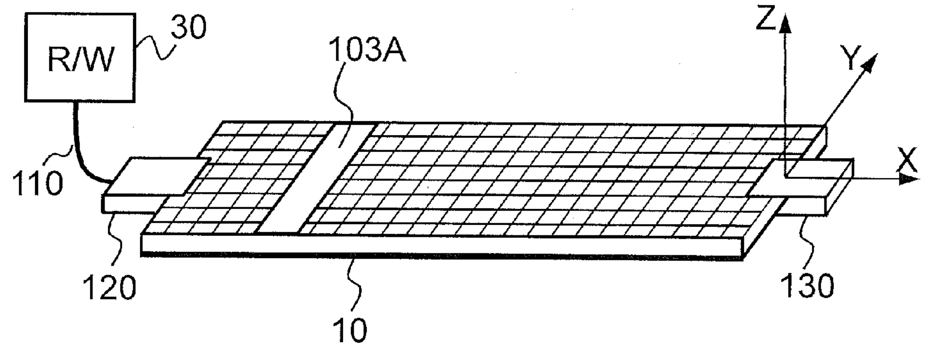
FIG. 11 is a diagram illustrating an altered embodiment of the antenna device according to the first embodiment.

In the explanation of the antenna device 1 according to the first embodiment, radiation plate 20 is explained as a member disposed separately from the sheet-shaped antenna 10. However, the radiation plate 20 may be integrated with the sheet-shaped antenna 10. More specifically, as illustrated in an example in FIG. 11, a conductive area 103A (a first conductive part or the meshed conductive layer) equivalent to the radiation plate 20 illustrated in FIG. 4 may be partially disposed on the meshed conductive layer 103. Since the conductive area 103A illustrated in FIG. 11 has the size corresponding to the width of the sheet-shaped antenna 10 in the Y-axis direction, such a situation may be imagined that it is difficult for the radiation plate 20 to surely obtain the length corresponding to a half wavelength of the working frequency in the Y-axis direction and hence it is difficult to attain a sufficient field strength. In the above mentioned situation, the length of the conductive area 103A in the Y-axis direction may be increased up to a value corresponding to a half wavelength of the working frequency.

(2) Second Embodiment

Next, an antenna device according to a second embodiment and an RFID system including the antenna device will be described.

As described above, as the application of the RFID system, in the case that an antenna device is mounted on a bottom surface of a shelf for inventory management of articles such as books, CDs or the like arrayed on the shelf, it is preferable to communicate with the RFID tags appended to the plurality of articles. From the above mentioned viewpoint, the antenna device according to the second embodiment is configured to excite each of the plurality of RFID tags regardless of the states of the respective RFID tags.

Figure 12:
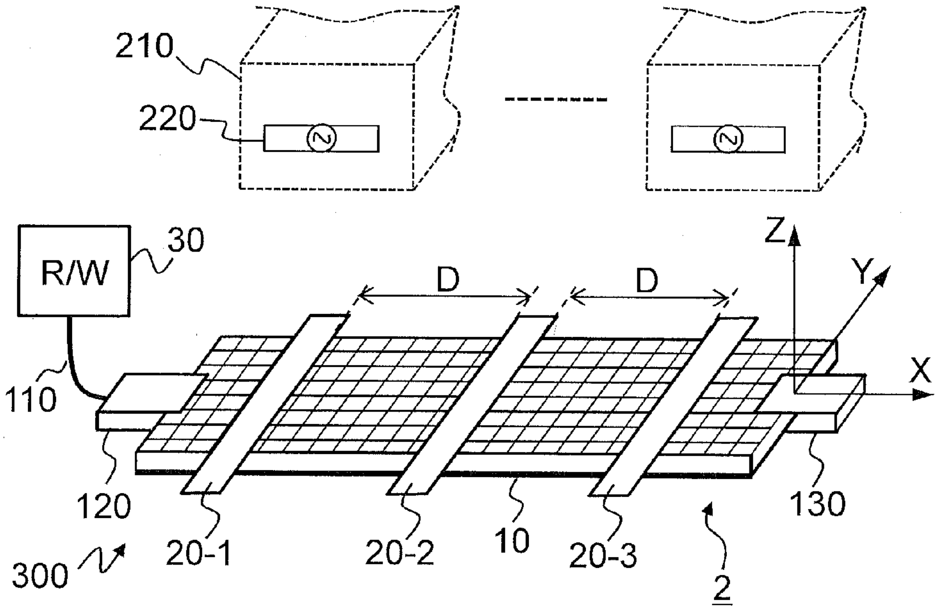
FIG. 12 is a diagram illustrating an example of an outline of an RFID system according to a second embodiment.

FIG. 12 illustrates an example of an outline of the RFID system 300 according to the second embodiment. In FIG. 12, the antenna device 2 according to the second embodiment includes a plurality of radiation plates (radiation plates 20-1 to 20-3) which are equivalent to the radiation plate 20 in the first embodiment. RFID tags 220 and articles 210 to which the RFID tags are appended are respectively arranged above the plurality of radiation plates 20-1 to 20-3. Owing to provision of the plurality of radiation plates 20-1 to 20-3, in the RFID system 300 according to the second embodiment, the antenna device 2 illustrated in FIG. 12 is allowed to excite each of the plurality of RFID tags 220 regardless of the state of each RFID tag 220.

Since the same details as those of the form of the radiation plate 20 and the manner of forming electric fields using the radiation plate 20, which are according to the first embodiment, directly apply to each of the plurality of radiation plates 20-1 to 20-3 according to the second embodiment. Accordingly, redundant explanation will be omitted.

In the antenna device 2, too short setting of a distance between the adjacent radiation plates (D: a first distance in FIG. 12) may cause such a problem that leakage electric fields leaked out through the sheet-shaped antenna 10 are interrupted by the plurality of radiation plates 20-1 to 20-3 to adversely affect the communication performance performed within the RFID system 300. Therefore, in the antenna device 2 according to the second embodiment, it may be preferable to set the distance D between the radiation plates 20-1 and 20-2 and between the radiation plates 20-2 and 20-3 to a value within an appropriate range.

Specifically, it may be preferable to set the distance D to a value with which the received power obtained by the RFID tag 220 become higher than the first predetermined reference value (for example, a minimum operating power of the RFID tag) when a RFID tag 220 is arranged above anyone of the radiation plates and in each of the states tagX, tagY and tagZ. It may be difficult to simply set the distance D to one standard value because the distance may vary depending on a plurality of parameters such as the level of leakage electric field of the antenna device 2, the elevation at which the RFID tag 220 is arranged, the minimum operating power of the RFID tag in an RFID system 300 to be used. However, if the above mentioned parameters are fixed, it will be allowed to roughly determine the appropriate range of the distance D by measuring each received power of the RFID tag 220. For example, under the measuring conditions described in relation to the first embodiment, the distance D is preferably within a range of 10 to 150 mm.

Figure 13:
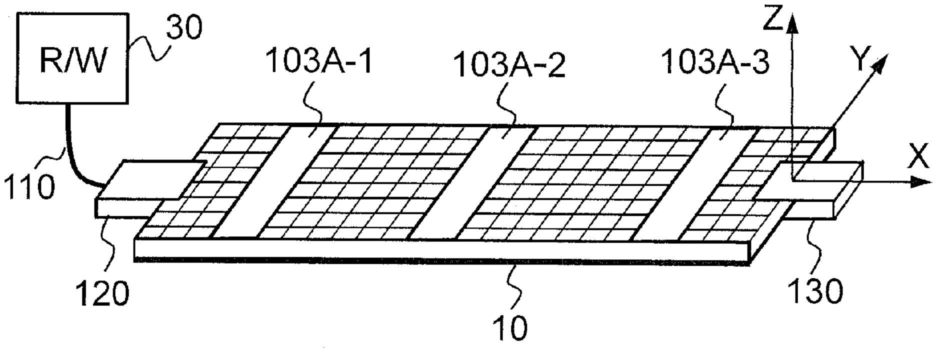
FIG. 13 is a diagram illustrating an altered embodiment of an antenna device according to the second embodiment.

The altered embodiment of the first embodiment may also apply to the second embodiment. For example, as illustrated in an example in FIG. 13, conductive areas 103A-1 to 103A-3 may be disposed on the meshed conductive layer 103, each of the conductive areas 103A-1 to 103A-3 is equivalent to the radiation conductive area 103A illustrated in FIG. 11.

(3) Third Embodiment

Next, there will be described an antenna device according to a third embodiment and an RFID system including the antenna device.

In the explanation of the RFID systems 200 and 300 according to the first and second embodiments, respectively, it has been described that excitation of the RFID tag 220 is allowed by disposing the radiation plate 20 on the sheet-shaped antenna 10 regardless of the state of the RFID tag 220. However, such a situation may sometimes occur that the size of the RFID tag 220 is reduced depending on layout conditions to be appended to an article, which will lead to increase difficulty of a sufficient antenna gain for the RFID tag 220. As a result, it may sometimes occur in such situation that a sufficient energy for exciting the RFID tag 220 will not produced by both of the leakage electric field and an enhanced electric field owing to the radiation 220. In the above mentioned situation, it may be preferable to attach a booster to the article to which the RFID tag is appended, whereby to amplify the leakage electric fields leaked out through the sheet-shaped antenna 10 and the electric fields generated owing to presence of the radiation plate 20. Japanese Laid-open Patent Publication No. 2009-280273 describes the booster as a conductor which is electromagnetically coupled with an antenna of a RFID tag.

Figure 14:
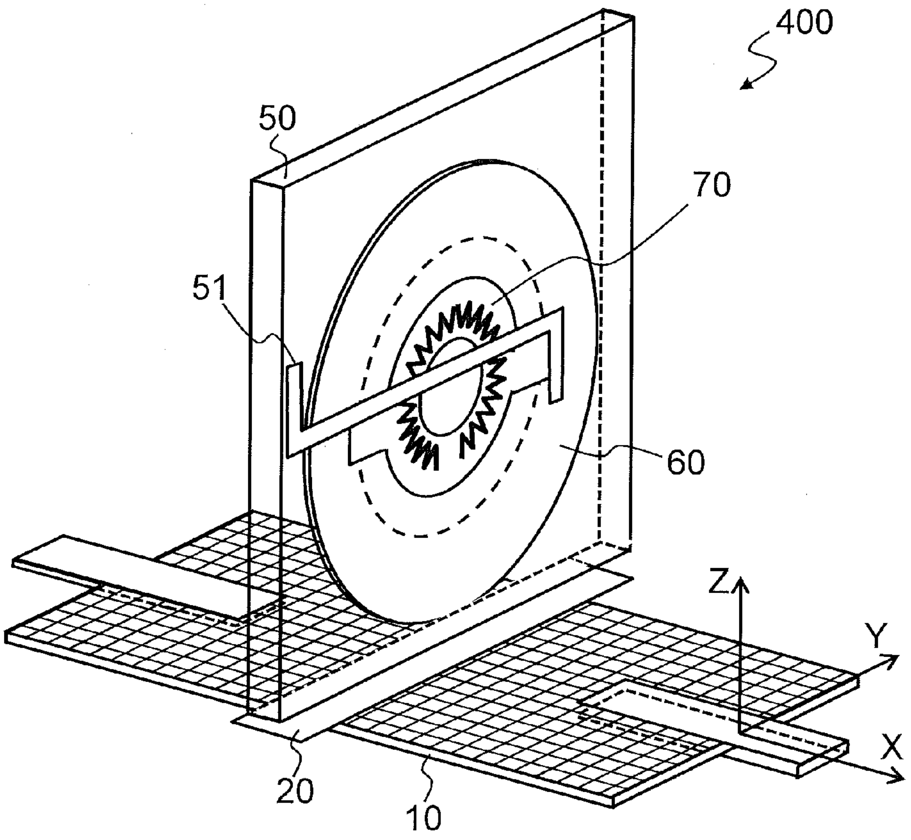
FIG. 14 is a diagram illustrating an example of an outline of an RFID system according to a third embodiment.

With reference to FIG. 14, there will be described an example of an outline of the RFID system 400 utilizing the booster according to the third embodiment. In FIG. 14, a case in which a RFID tag 70 is attached to a compact disk (CD) as an article is illustrated by way of example and other elements such as a reader/writer and the like are omitted for the convenience of explanation. In FIG. 14, for example, it is supposed that the sheet-shaped antenna 10 is mounted on a bottom part of a shelf on which CDs are arrayed as articles to be managed. Although only one CD case 50 is illustrated in FIG. 14, a plurality of CD cases 50 may be present as long as a distance between the adjacent CD cases is set to a value with an appropriate range. It is also supposed that the shelf is partitioned using partition plates (not illustrated) between which each CD case 50 would be contained such that the plurality of CD cases 50 may be stably put on the radiation plate 20.

The radiation plate 20 in the rectangular form is arranged such that the long side of the rectangle is in parallel with the Y-axis. A booster 51 (a second conductive part) is a conductive plate which is formed of a metal such as, for example, copper or the like and is arranged substantially in parallel with the radiation plate 20, that is, the longitudinal direction of the booster 51 is arranged substantially in parallel with the Y-axis. Owing to the above mentioned arrangement, it may become possible to amplify electric fields generated owing to presence of the radiation plate 20 by electromagnetic coupling between the radiation plate 20 and the booster 51. In addition, the leakage electric fields that leak out on the sheet-shaped antenna 10 are also amplified using the booster 51.

Figure 15A:
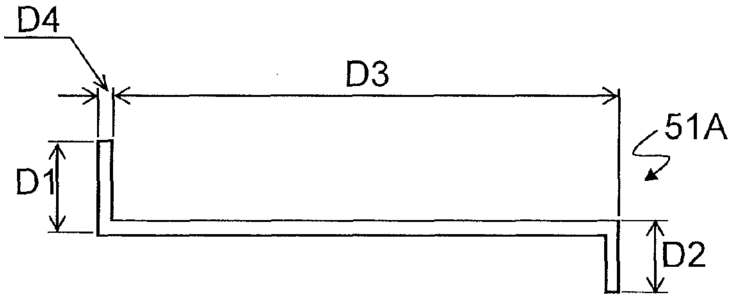
FIG. 15A to FIG. 15C are diagrams illustrating altered embodiments in the form of a booster according to the third embodiment.
Figure 15B:
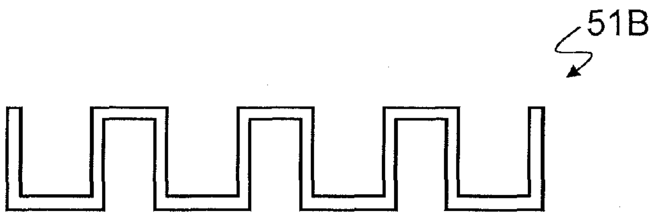
Figure 15C:

For example, examples of the form of the booster 51 are illustrated in FIGS. 15A to 15C. FIGS. 15A to 15C illustrate the booster 51 of a crank form, a meander form, and a zigzag form, respectively. The form of the booster illustrated in FIG. 15A is the same as that of the booster 51 illustrated in FIG. 14.

Preferably, the length of the booster 51 is equal to a half wavelength of a working frequency and the booster 51 has a perfect rectangular form as long as an article has a sufficient large area on which the booster 51 is to be attached. However, in the case that the size of an article to which the booster 51 is to be attached is smaller than the half wavelength of the working frequency, the length which is equal to the half wavelength of the working frequency may be surely obtained by adopting one of forms as illustrated in FIGS. 15A to 15C. For example, when the booster 51 has the crank form, the booster 51 may have preferable dimensions of D1=D2=10 mm, D3=120 mm, and D4=2 mm.

Figure 16A:
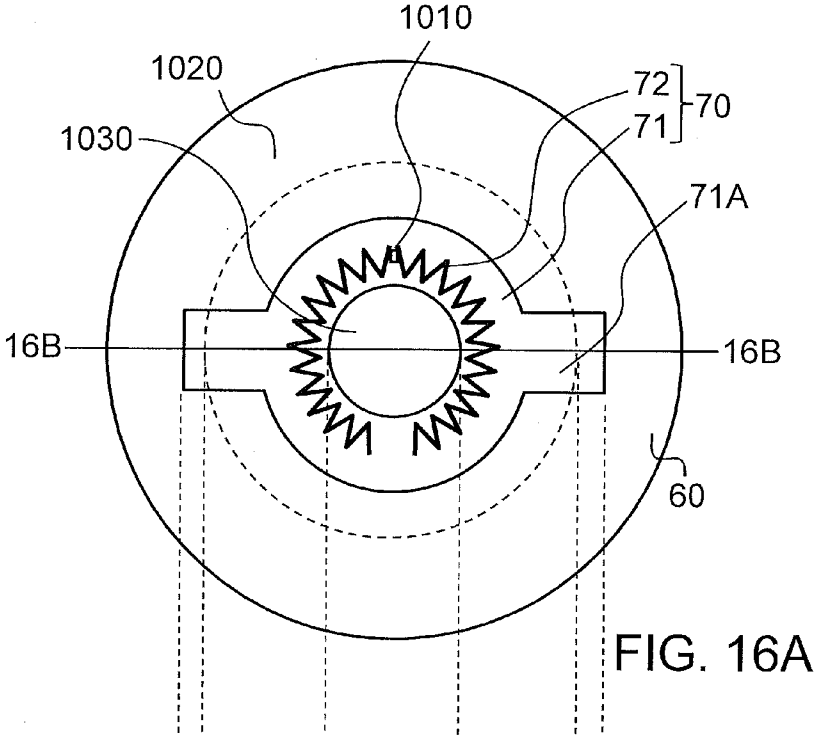
FIG. 16A and FIG. 16B are diagrams illustrating examples of a CD to which a RFID tag is appended in the third embodiment.
Figure 16B:
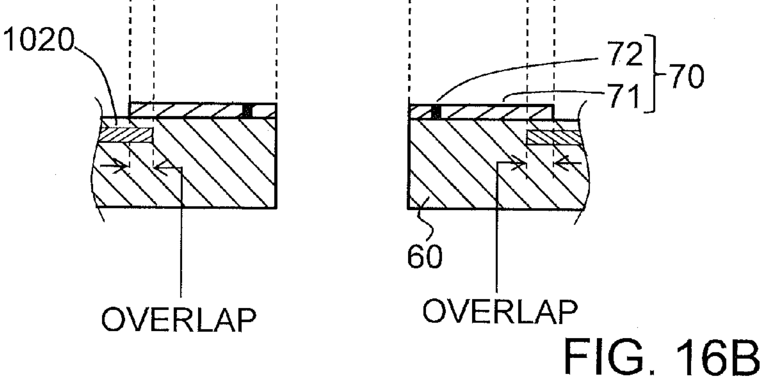

FIGS. 16A and 16B illustrate an example of a compact disk (CD) 60 to which a RFID tag 70 is appended, in which FIG. 16A is a plan view thereof and FIG. 16B is a sectional diagram thereof along the line 16B-16B in FIG. 16A.

In FIG. 16A, the RFID tag 70 is appended around a central hole 1030 on the inner peripheral side of a surface (a so-called label surface) opposite to a read surface of the CD 60, for example, with an adhesive or the like. In the RFID tag 70, a slot (a groove) 72 is formed in a conductive plate 71 in a shape of an annular (a doughnut-like) to form a slot antenna. The slot 72 extends from an IC chip 1010 as a feed point toward the both sides and exhibits an arch-shaped meander form as a whole. The IC chip 1010 is embedded in the conductive plate 71.

In FIG. 16, a plurality of V-shaped parts are coupled with one another in an arch to configure the meander form of the slot 72. The reason why the V-shaped parts are applied to configure the meander form lies in that although currents flowing through a conductive on the outer side of the adjacent V-shaped parts of the slot flow in opposite directions, mutually oppositely directed current vectors are obliquely oriented to reduce the canceled amount of electromagnetic waves generated with oppositely flowing currents.

The conductive plate 71 of the RFID tag 70 is formed such that two extending parts 71A are disposed to overlap a metal part 1020 on a recording surface in the CD 60 when viewed in a plane. Owing to provision of the extending parts 71A, the conductive plate 71 of the RFID tag 70 is electromagnetically coupled with the metal part 1020 on the recording surface in the CD 60, thereby sufficiently radiating radio waves through the slot 72.

Since the CD 60 contained in the CD case 50 is disposed to be freely rotatable along the surface of the CD case 50, although the RFID tag 70 which is appended to the CD 60 may be set in either the state tagY or the state tagZ, the RFID tag 70 may not be set in the state tagX.

Figure 17:
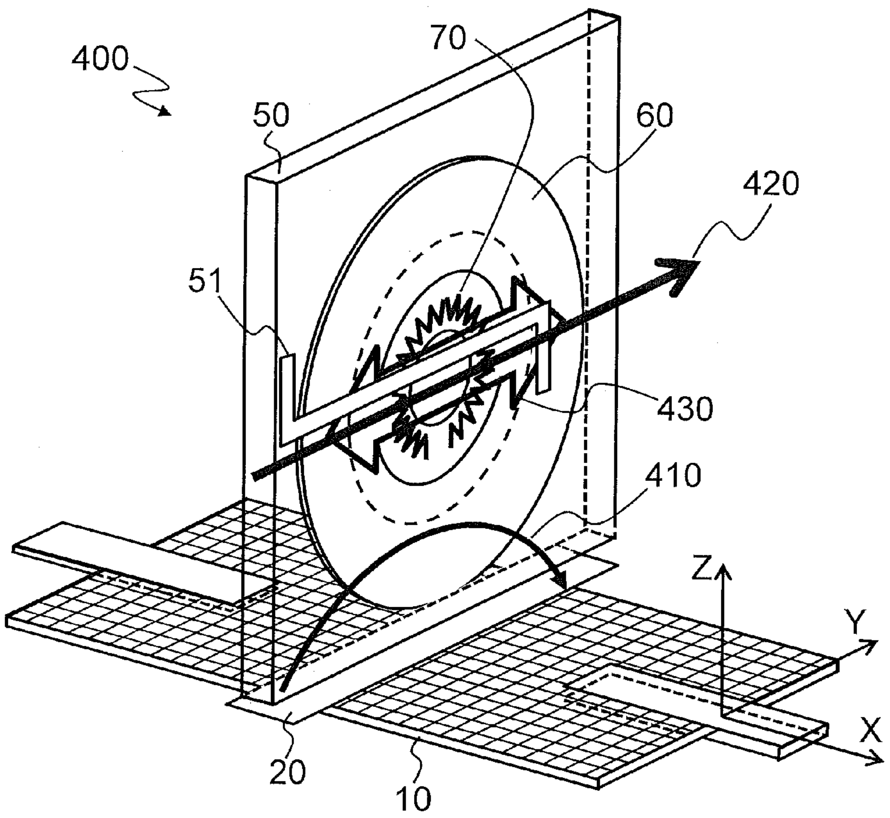
FIG. 17 is a diagram explaining an example of the operation of the RFID system according to the third embodiment.

The operation of the RFID system 400 according to the third embodiment will be described with reference to FIG. 17. In FIG. 17, arrowed lines 410, 420, and 430 are indicate an electric field generated owing to presence of the radiation plate 20, an electric field excited using the booster 51, and polarizing directions (in parallel with the Y-axis in the example illustrated in FIG. 17) of the RFID tag 70, respectively.

As illustrated in FIG. 17, on the radiation plate 20, components of the leakage fields from the sheet-shaped antenna 10 directed in the +Y and −Y directions are interrupted to generate electric fields in the +Y direction. In FIG. 17, one bold line 410 represents a plurality of radial electric lines of force directed in the +Y direction. On the other hand, since the booster 51 is arranged substantially in parallel with the radiation plate 20, the electric field generated owing to presence of the radiation plate 20 is amplified by electromagnetic coupling of the radiation plate 20 with the booster 51. That is, since the electric field 420 excited with the booster 51 is generated as illustrated in FIG. 17, the RFID tag 70 may become possible to be excited.

Though not illustrated in FIG. 17, radial leakage electric fields directed in the +X or −X direction are generated on the radiation plate 20 so as to stride over the radiation plate 20 and these leakage electric fields are also amplified using the booster 51.

Thus, owing to provision of the booster 51 on the CD case 50, it may become possible to excite the RFID tag 70 even when the small-sized RFID tag 70 has a low antenna gain and is set in either the state tagY or the state tagZ.

The inventors conducted an experiment on the RFID system 400 according to the third embodiment using an electromagnetic field simulator as to whether a reader/writer is allowed to communicate with a RFID tag 70 under various conditions. In other words, the experiment was directed to whether the reader/writer is allowed to read data out of the RFID tag 70. A result of the experiment conducted is illustrated in Table 1. In the Table 1, the types A and B of the booster indicate the booster 51A illustrated in FIG. 15A and the booster 51C illustrated in FIG. 15C, respectively. In addition, a reference power on the basis of which whether the RFID tag 70 is readable/unreadable is judged is set to −17 dBm (a second reference value) for a received power Ptag of the RFID tag.

TABLE 1

| Conditions and results | | | | |
|---|---|---|---|---|
| | Detail of condition | | | |
| No. of condition | RFID tag polarizing direction | Radiation plate | Booster | Result Ptag [dBm] (Pmin = −17 dBm) |
| 1 | Y-axis | absence | absence | −34: unreadable |
| 2 | Y-axis | presence | absence | −24: unreadable |
| 3 | Y-axis | presence | type A | −10: readable |
| 4 | Y-axis | presence | type C | −11: readable |
| 5 | Z-axis | absence | absence | −20: unreadable |
| 6 | Z-axis | presence | absence | −23: unreadable |
| 7 | Z-axis | presence | type A | −12: readable |
| 8 | Z-axis | presence | type C | −12: readable |

In table 1, referring to the conditions 1 to 3 in which the polarizing direction of the RFID tag is the Y-axis direction, it was confirmed that the received power Ptag of the RFID tag 70 had been increased by 10 dB by setting the radiation plate 20 in comparison with a case in which the radiation plate 20 was absent and had been further increased by 14 dB by setting the booster, by which the RFID tag 70 had become readable. Referring to the conditions 4 to 6 in which the polarizing direction of the RFID tag 70 is the Z-axis direction, it was confirmed that although the level of leakage electric field had been reduced by setting the radiation plate 2 and under the condition 5, the received power Ptag of the RFID tag 70 had been lower than that under the condition 4, the received power Ptag had been greatly increased by adding the booster in the condition 6. Incidentally, any great difference in performance was not confirmed between the type A and type B boosters regardless of the polarizing direction of the RFID tag 70.

Figure 18:
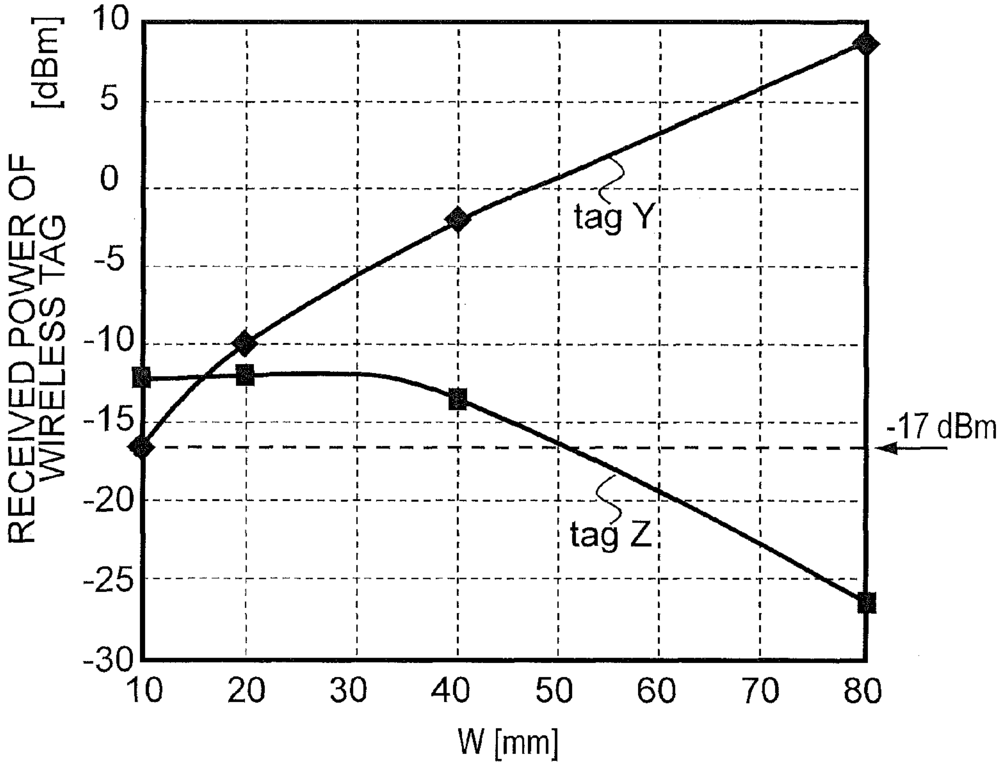
FIG. 18 is a graph illustrating an example of a relation between the width of a radiation plate and the received power of a RFID tag in the RFID system according to the third embodiment.

FIG. 18 illustrates an example of another result in the form of a graph of measurement conducted using another electromagnetic field simulator. The graph indicates a relation between the width (the length in the Y-axis direction: W [mm]) of the radiation plate 20 and the received power [dBm] of the RFID tag 70 obtained when the type A booster was used.

According to the result of measurement illustrated in FIG. 18, almost the same tendencies as those of the result obtained by using the standard dipole antenna illustrated in FIG. 9 was confirmed for the same reason as that of the operation which has been described with reference to FIG. 9. That is, it is found that the received power obtained when the RFID tag 70 is in the state tagY generally serves as the increasing function for the width (W) of the radiation plate 20 and the received power obtained generally serves as the decreasing function for the width (W) of the radiation plate 20 when the RFID tag 70 is in the state tagZ.

In FIG. 18, when a reference power as a minimum power for reading out data from the RFID tag 70 is set to −17 dBm, it may become possible to excite the RFID tag 70 by setting the width (W) of the radiation plate 20 in range of 10 to 50 mm regardless of the state of the RFID tag 70. As described above, it may be preferable to obtain the same received power value regardless of the state of the RFID tag 70, that is, regardless of the rotational position of the CD 60 in the CD case 50). From the above viewpoint, it may be more preferable to set the width of the radiation plate 20 to a value in range of about 13 to 20 mm in FIG. 18 with which the received power obtained by the RFID tag 70 in the state tagY becomes substantially equal to the received power obtained by the RFID tag 70 in the state tagZ.

As described above, the appropriate range of the width of the radiation plate 20 may vary depending on the plurality of parameters such as the level of the leakage electric field of the antenna device 1, the elevation at which the RFID tag 70 is positioned in accordance with an article used, the minimum operating power of the RFID tag and the like. For example, a preferable range of the width of the radiation plate 20 which is set for an article such as a Digital Video Disk, a Blue-ray Disc or the like may be different from that set for the CD.

As described above, the antenna devices and the RFID systems according to the embodiments may allow the RFID tag to receive radio wave from the antenna devices regardless of a direction in which the RFID tag is arranged.

Although the plurality of embodiments of the present invention have been described in detail, the antenna device and the RFID system according to the present invention are not limited to the above mentioned embodiments and may be modified and altered in a variety of ways within a range not departing from the gist of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An antenna device for transmitting a radio wave to a tag capable of receiving the radio wave, the antenna device comprising:

a first layer which is electrically conductive;

a second layer disposed parallel to the first layer and apart from the first layer and being electrically conductive so as to generate an electromagnetic wave travelling along a first axis, the second layer including a plurality of portions that are electrically non-conductive so as to generate a leakage electric field above the second layer;

a communication interface coupled to one end of the first layer;

a terminator on the other end of the first layer; and a first plate which is electrically conductive, the first plate being disposed on or above the second layer between the communication interface and the terminator and being a physical first length along the first axis so that a power of the radio wave received by the tag is equal to or larger than a reference value when the tag is placed at a first elevation spaced above the first plate and is placed parallel to either of the first axis, a second axis orthogonal to the first axis and parallel to the second layer, or a third axis orthogonal to the first and second axis, wherein the reference value is higher than a power of the radio wave received by the tag for any length of the first plate shorter than the first length with the tag being placed at the first elevation spaced above the first plate and parallel to the second axis.

2. The antenna device according to claim 1, wherein the first length is set to a length so that a second power is approximately equal to one of a first power and a third power, where the first power, the second power, and the third power are corresponding to respective powers received by the tag when the tag is placed in parallel to the first axis, the second axis, and the third axis, respectively.

3. The antenna device according to claim 1, wherein the first plate has a second length along the second axis corresponding to a half wavelength of a frequency of the radio wave.

4. The antenna device according to claim 2, wherein the first plate has a second length along the second axis corresponding to a half wavelength of a frequency of the radio wave.

5. The antenna device according to claim 3, wherein the first length is shorter than the second length.

6. The antenna device according to claim 4, wherein the first length is shorter than the second length.

7. The antenna device according to claim 5, wherein a plurality of the first plates are disposed on or above the second layer, and a distance between the first plates adjacent to each other is set so that each of powers received by the tag is equal to or larger than the first reference value when the tag is placed at the first elevation and parallel to one of the first axis, the second axis, and the third.

8. The antenna device according to claim 1, wherein the first axis is an X-axis of an X-Y-Z coordinate system; and the second axis is a Y-axis of the X-Y-Z coordinate system.

9. The antenna device according to claim 1, wherein a length of the first plate along the second axis is longer than a length of the second layer along the second axis.

10. The antenna device according to claim 1, further comprising:

a reader/writer connected to the communication interface.

11. A radio frequency identification system for communication with a tag appended to an article, the tag being capable of receiving and transmitting radio waves, the radio frequency identification system comprising:

an antenna device including:

a first layer which is electrically conductive, a second layer disposed parallel to the first layer and apart from the first layer and being electrically conductive so as to generate an electromagnetic wave travelling along a first axis, the second layer including a plurality of portions that are electrically non-conductive so as to generate a leakage electric field above the second layer, a communication interface coupled to one end of the first layer, a terminator on the other end of the first layer, and a first plate which is electrically conductive, the first plate disposed on or above the second layer between the communication interface and the terminator, the first plate having a short side parallel to the first axis and a long side parallel to a second axis that is orthogonal to the first axis and parallel to the second layer, the short side being a physical length so that a power of the radio wave received by the tag is equal to or larger than a reference value when the tag is placed at an elevation spaced above the first plate and is placed parallel to either of the second axis or a third axis orthogonal to the first and second axis, wherein the reference value is higher than a power of the radio wave received by the tag for any shorter length of the short side with the tag being placed at the first elevation spaced above the first plate and parallel to the second axis.

12. The radio frequency identification system according to claim 11, wherein the length of the short side is set to a length so that a second power is approximately equal to a third power, where the second power and the third power are corresponding to respective powers received by the tag when the tag is placed in parallel to the second axis and the third axis, respectively.

13. The radio frequency identification system according to claim 11, wherein a length of the long side of the first plate corresponds to a half-wave length of a frequency of the radio wave.

14. The radio frequency identification system according to claim 12, wherein a length of the long side of the first plate corresponds to a half-wave length of a frequency of the radio wave.

15. The radio frequency identification system according to claim 11, wherein a plurality of the first plates are disposed on or above the second layer, each of the plurality of the first plates has a short side parallel to the first axis and a long side parallel to the second axis, a length of the short side being shorter than a length of the long side, a distance between the first plates adjacent to each other is set so that each of powers received by the tag is equal to or larger than the reference value when the tag is placed at the first elevation and parallel to each of the second axis and the third.

16. The radio frequency identification system according to claim 11, further comprising a second plate that is electrically conductive and is capable to be appended to the article so as to be parallel to the second axis.

17. The radio frequency identification system according to claim 12, further comprising a second plate that is electrically conductive and is capable to be appended to the article so as to be parallel to the second axis.

18. The radio frequency identification system according to claim 13, further comprising a second plate that is electrically conductive and is capable to be appended to the article so as to be parallel to the second axis.

19. The radio frequency identification system according to claim 14, further comprising a second plate that is electrically conductive and is capable to be appended to the article so as to be parallel to the second axis.

20. The radio frequency identification system according to claim 19, wherein the second plate has a length corresponding to a half-wave length of a frequency of the radio wave.

21. The radio frequency identification system according to claim 11, wherein the first axis is an X-axis of an X-Y-Z coordinate system; and the second axis is a Y-axis of the X-Y-Z coordinate system.

22. The radio frequency identification system according to claim 11, wherein a length of the first plate along the second axis is longer than a length of the second layer along the second axis.

23. An antenna device for transmitting a radio wave to a tag capable of receiving the radio wave, the antenna device comprising:

a first layer which is electrically conductive and has first and second ends;

a second layer disposed parallel to the first layer and apart from the first layer and being electrically conductive so as to generate an electromagnetic wave travelling along a first axis, the second layer including a plurality of portions that are electrically non-conductive so as to generate a leakage electric field above the second layer; and a first plate which is electrically conductive, the first plate being disposed on or above the second layer and being a physical first length along the first axis so that a power of the radio wave received by the tag is equal to or larger than a reference value when the tag is placed at a first elevation spaced above the first plate and is placed parallel to either of the first axis, a second axis orthogonal to the first axis and parallel to the second layer, or a third axis orthogonal to the first and second axis, the first plate being disposed between the first and second ends of the first layer, one of the first and second ends of the first layer being provided with a portion to be coupled to a communication interface and the other of the first and second ends of the first layer being provided with a terminator so that the first plate is thereby between the communication interface and the terminator.

24. The antenna device according to claim 23, wherein a length of the first plate along the second axis is longer than a length of the second layer along the second axis.

* * * * *